PULSE DURATION MODULATION TO DIGITAL CONVERTER

Filed May 10, 1963 3 Sheets-Sheet 1

INVENTOR.
FRED B. COX Jr.
BY Wade Koontz and Martin J. Finnegan
ATTORNEYS

INVENTOR.
FRED B. COX Jr.
BY Wade Koontz and Martin J. Finnegan
ATTORNEYS

INVENTOR.
FRED B. COX Jr.
BY
ATTORNEYS

3,268,886
PULSE DURATION MODULATION TO DIGITAL CONVERTER

Fred B. Cox, Jr., Fullerton, Calif., assignor to the United States of America as represented by the Secretary of the Air Force Filed May 10, 1963, Ser. No. 279,644
4 Claims. (Cl. 340—347)

The invention described herein may be manufactured and used by or for the United States Government for governmental purposes without payment to me of any royalty thereon.

This invention relates to the conversion of pulse width samples to proportional digital numbers; more particularly, the converter accepts data from a pulse duration modulation (PDM) commutator, measures the width of each pulse, and converts the results into digital form.

A PDM-to-digital converter is of value in high speed computing and digital control equipment to perform the function of pulse width measurement. Use of the converter allows direct compatability with other logical elements of a binary system.

It is one object of this invention to convert pulse duration modulation samples into digital form.

It is an other object of this invention to process simultaneous inputs from up to five standard commutators and merge them into a standard output format.

It is another object of this invention to process data pulses and maintain synchronization with the input data, thus preventing loss of data and transient malfunctions of the converter.

Figures 3, 4, 5, 6, 7, 8:
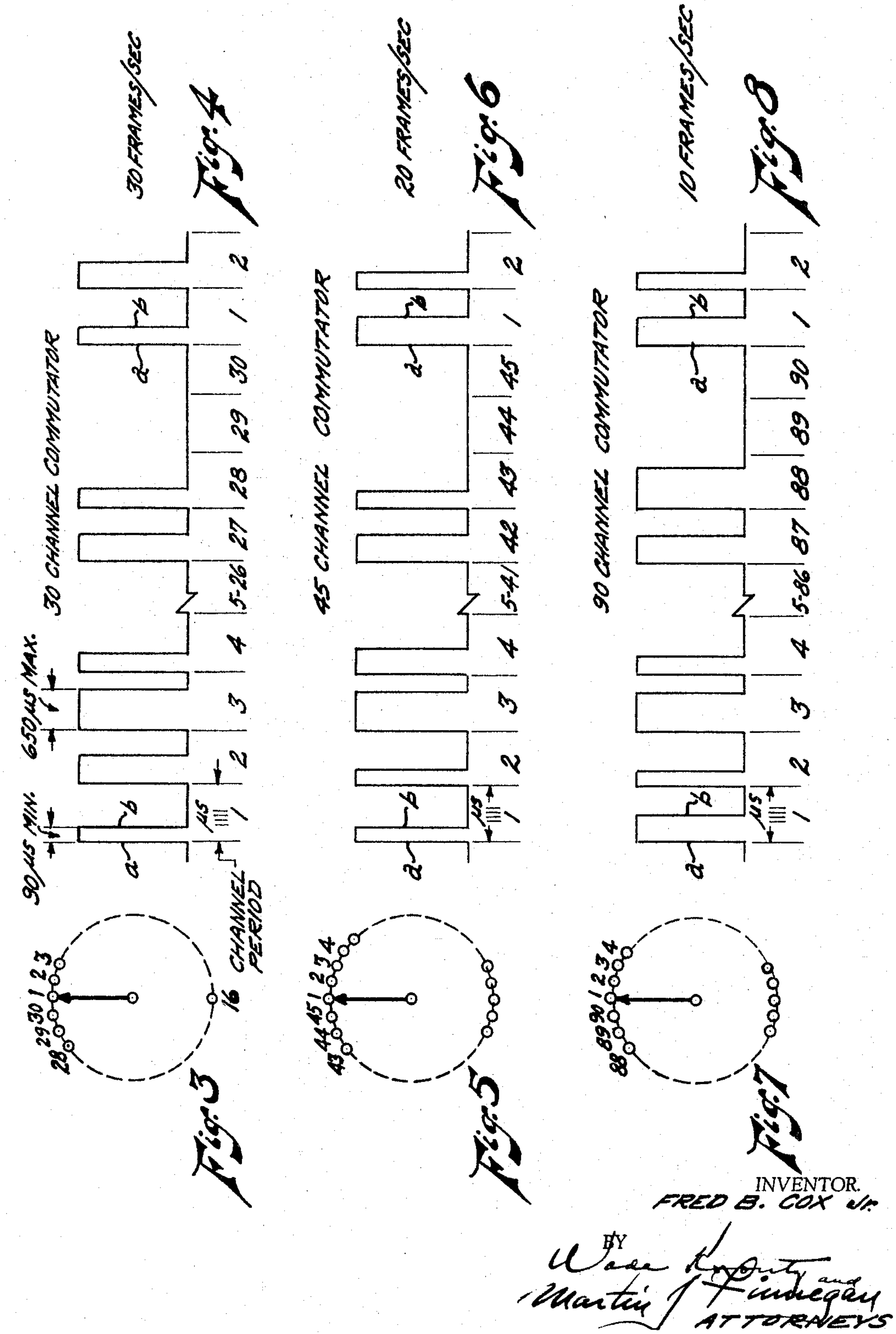

FIGS. 3, 5 and 7 show schematically the structure of the PDM commutators for processing the data-reresenting pulses in patterns of 34, 45 and 90 channels, respectively; and FIGS. 4, 6 and 8 show the pulse duration patterns associated with use of the structural arrangements of FIG. 3, 5 and 7, respectively.

The PDM-to-digital converter illustrated in the drawings was designed to convert data from standard 30, 45, and 90 channel commutators, or any combination of these commutators, and merge this data into a standard output format. To allow any commutator sizes to be processed simultaneously, the basic output frame of data for any commutator is 90 digital words. Thus, three input frames from a 30-channel commutator are required to produce one output frame; two input frames and one input frame from 45 and 90 channel commutators respectively, are required to produce one output frame.

FIGS. 3 through 8 show the format of 30, 45, and 90 channel standard PDM commutators. As shown in these figures, the last two channels in the input frame of the commutator do not contain pulses. The absence of pulses in these channels is used to identify the end of an input frame. Since no data is recorded in these channel locations, they are used to store time words—the word stored in the first vacant channel is the time of day word recorded on tape, while the word stored in the second vacant channel is a vernier count, which provides a fine resolution, to one millisecond, of the one second intervals in the time-of-day word. Hence, the output frame for a 30-channel commutator contains time samples in words 29 and 30, 59 and 60, and 89 and 90; the output frame of a 45-channel commutator contains time samples in words 44 and 45, and 89 and 90, while the 90-channel commutator has time samples in words 89 and 90.

An output record is composed of one output frame for each commutator input. If rate data is processed concurrently, the output record will also contain a 90 word frame of rate data, regardless of the number of rate channels processed. Blank words are inserted in the rate data output record if necessary to preserve the 90 word format. Hence the output record always contains a multiple of 90 data words, ranging from 90 for one commutator input to 450 words for five commutator inputs.

Figure 1:
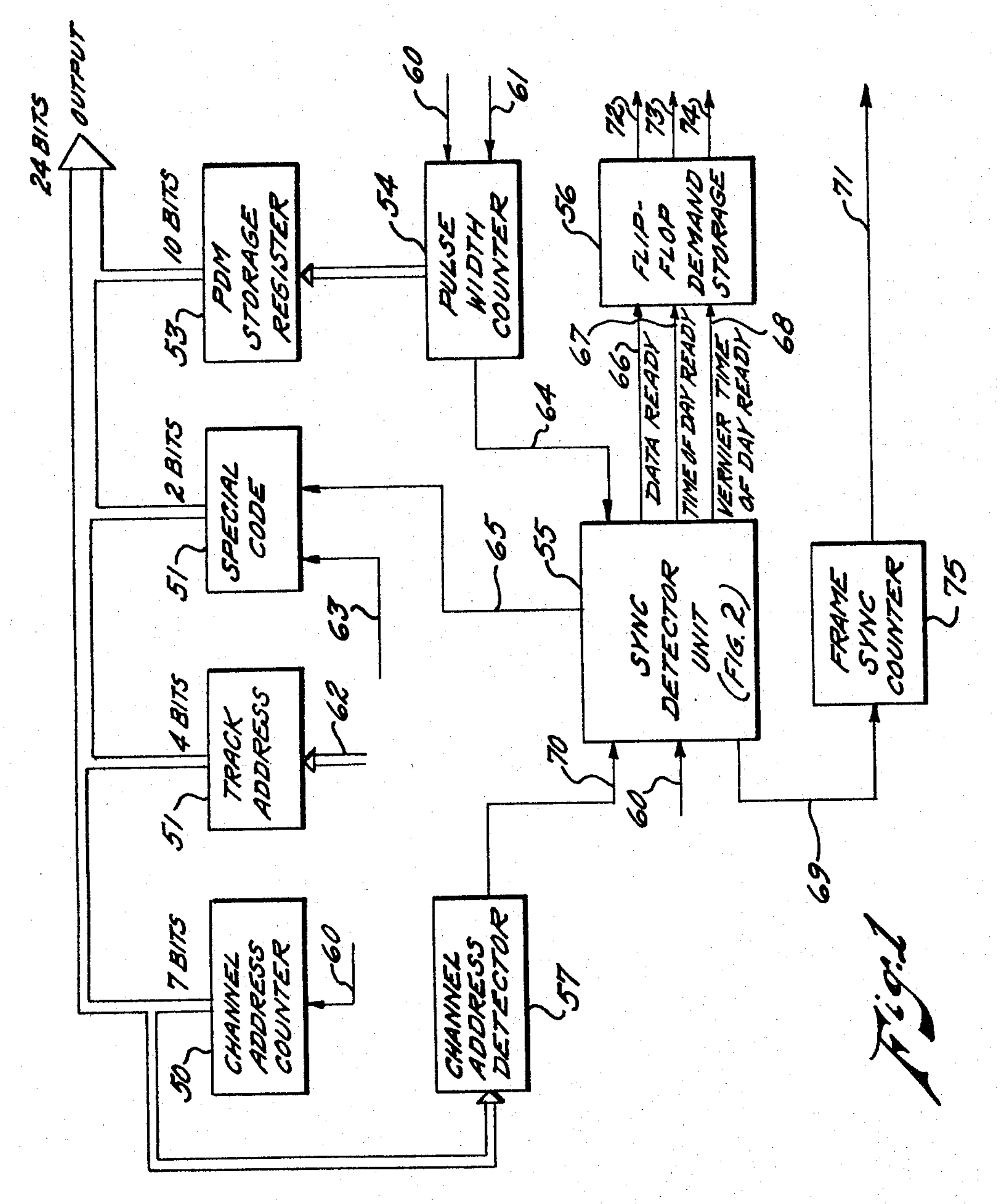
FIG. 1 is a block diagram showing the component parts entering into the preferred embodiment of the invention.

The operation of the converter can be explained by reference to the block diagram, FIG. 1, and the format diagram, FIGURES 3 to 8.

As shown in FIGURES 3 through 8, data pulses occur during the channel period, the duration of each pulse being proportional to the amplitude of the sampled parameter. The zero and full scale references are approximately 90 and 650 microseconds, respectively, with all data pulse widths falling within this range. Channels which contain no measurement are normally held at the zero reference, with the exception of the last two channels in the input frame.

The basic technique employed to convert a pulse width sample to digital form is to count the time interval between leading and trailing edges of each pulse. This interval is counted at one megacycle rate to give a pulse resolution of one microsecond. Since the pulse width can go up to 650 microseconds, the converted data sample is a 10-bit binary number.

Pulse duration modulated data pulses are fed to the converter from magnetic tape play back amplifiers. The leading and the trailing edge of each data pulse, *a* and *b*, in FIGURES 3 through 8, are detected to produce a leading edge pulse $C_L$ and a trailing edge pulse $C_T$. As seen in FIG. 1, leading edge pulse 60 is applied to pulse width counter 54 (PWC), Channel Address Counter 50 (CAC) and Sync Detector Unit 55.

The pulse width counter is an 11-bit binary counter which is ordinarily free-running; i.e. the first stage of the counter is indexed at the one megacycle clock rate, so that the count rate is equal to the one megacycle clock frequency. This counter is a straight-forward digital counter, as for example, of the type described in "Digital Computer Components and Circuits" by R. K. Richards on page 177.

Upon the arrival of the leading edge pulse, the PWC is reset to zero; the PWC then starts counting at one megacycle clock rate, and continues counting until reset to zero by the next leading edge pulse generated by the next data pulse, or by an overflow pulse generated at 1200 microseconds when a missing channel at the end of a frame occurs.

When the trailing edge of the current data pulse arrives, trailing edge pulse 61 $C_t$ is generated; this pulse transfers the count in the PWC to PDM Storage Register (PSR) 53, by use of coincident circuits.

Trailing edge pulse 61 is also used to turn on a Data Demand Flip Flop 56, which is used to signal the memory control logic that a data word is ready for storage.

Pulse Storage Register (PSR) 53 is a buffer register which stores the data count prior to storage of the sample in memory. This register is required since the PWC continues to count until reset by a leading edge pulse (generated by the next data pulse) or by an overflow pulse (generated at 1200 microseconds when no data pulse occurs). This register consists of ten flip-flops with associated gates, which allow the register to store the contents of the PWC when either a trailing edge pulse or an overflow pulse appears on the input line.

Leading edge pulse 60, applied to Channel Address

Counter 50, indexes this counter to the current channel address. Channel Address Counter (CAC) 50 is a 7-bit counter which stores the binary address of the channel currently being digitized. The content of this counter is advanced by one count each time a leading edge pulse is generated from the current data pulse. The CAC is also indexed by the overflow pulse which occurs when a missing channel at the end of a frame occurs, or when a leading edge pulse is not detected. This counter is also a straightforward binary counter, of the type similar to the PWC.

The channel address is held in the CAC and the data count is held in the PSR until the memory control can transfer these counts, together with track address and any special code bits, to memory. This transfer is timed to occur before the leading edge pulse in the next channel arrives. When the next leading edge pulse arrives, the PWC is reset to zero, the CAC is indexed to the next address, and the above sequence of events is repeated.

Each channel containing data is processed as described above. However, when the missing channels at the end of the frame occur, a different sequence of events takes place. Failure to receive a leading edge pulse in the first vacant channel will allow the PWC to continue counting. Since the maximum channel time is approximately 1170 microseconds, the PWC is programmed to generate an overflow pulse 64 at 1200 microseconds to insure that the leading edge pulse is indeed missing. Overflow pulse 64 is generated by detecting the state of the counter which represents 1200 microseconds, by use of coincident circuits.

Overflow pulse 64 indexes CAC 50 to the address of the first vacant channel, and also generates a demand 67 to store time of day. Overflow pulse 64 is also delayed by one microsecond and is used to reset PWC. Since no leading edge pulse occurs in the next vacant channel, a second overflow pulse is generated 1200 microseconds later. This overflow indexes the CAC to the next address and generates the demand to initiate storage of vernier time 68 in the last channel of the frame. It is also used to reset the PWC after a delay of one microsecond.

In the event a leading edge pulse is not detected, due to some malfunction, the PDM unit is designed so that binary zero is stored in memory. This provides a positive indication that the data channel was lost due to dropout. This is accomplished as follows—if a leading edge pulse is missed, the PWC will not be reset and an overflow pulse will be generated, as mentioned above. Sync Detector 55 will interpret this as a channel dropout and will generate a pulse $Z_3$, FIG. 2 to reset the PSR and turn on a demand flip flop to store binary zero. An inhibit flip flop is also set so that trailing edge pulse $C_T$ will not transfer in a count from PSR before zero is stored in the PSR, even if pulse $C_T$ is not lost.

Channel Address Detector 57 detects the address of the channel which immediately precedes the first vacant frame sync channel. For a 30-channel system, three such addresses must be detected since the Channel Address Counter is not reset until three input frames have been processed. The three addresses detected are the 28th, 58th, and the 88th. For a 45-channel system, two address detections are required, 43rd and 88th, while in a 90-channel system, only channel 88 need be detected. All addresses are detected by use of coincident circuits actuated by the appropriate stages of the PWC which represent the appropriate address in binary form.

The function D (70 in FIG. 1) is defined as the Frame-Ending channel and must occur at the end of each input frame. Hence, for the 30-channel commutator, D is equal to $D_{28}+D_{88}$. For a 45-channel commutator, $D=D_{43}+D_{88}$. For 90 channels, $D=D_{88}$. The proper D function for the size commutator being processed is selected by control relays, controlled from the console by a channel selector switch.

Sync Detector 55 is a sequential logic network which is designed to maintain frame synchronization in the presence of data dropouts. This is essentially a safeguard against dropouts of data pulses and also against transient malfunction of the converter itself. To accomplish this, the detector examines the sequence of leading edge pulses, overflow ($X_0$) pulses, and D inputs which occur during a frame, and generates control pulses to either search for or maintain frame synchronization.

The sync detector (FIG. 2) operates in two modes; Sync and Search. In the sync mode, the detector Flip Flops A, B, and C, respectively, may be in state 0, 1, 0, state 0, 1, 1, or state 1, 0, 1. In the search mode, the flip flops may be in either state 1, 1, 1 or state 1, 0, 0.

While data channels are being processed, the Sync Detector will remain in state 0, 1, 0. $C_L$ pulses do not produce a transition out of state 0, 1, 0.

Figure 2:
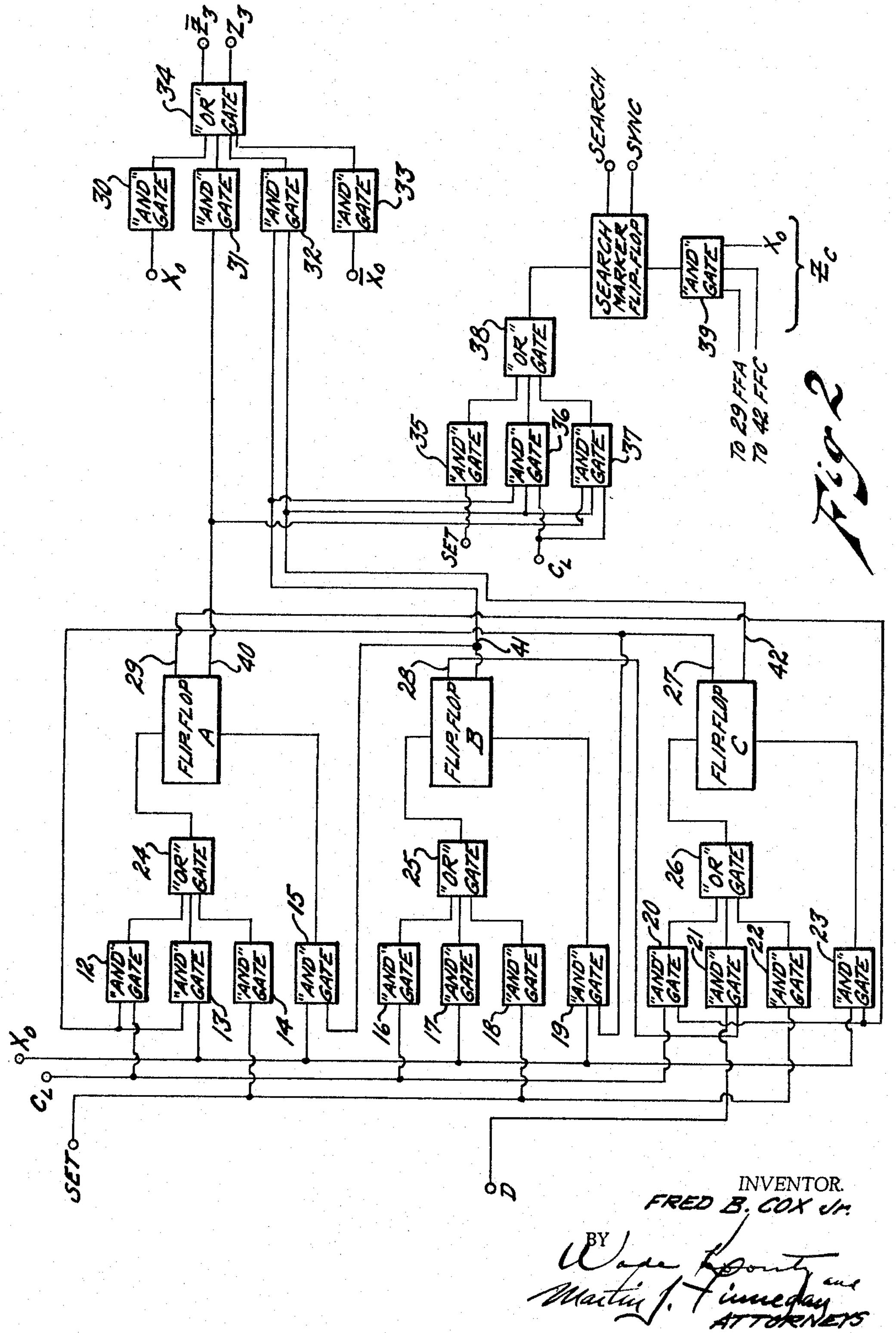
FIG. 2 is a logic diagram showing in block form the sequence of operations in the functioning of the Sync Detector Unit of FIG. 1.

In the logic diagram of FIG. 2, Nos. 12 through 23 respectively, are "AND" gates; these gates have no output unless all inputs are energized at the same time; Nos. 24, 25, and 26 are "OR" gates, which provide an output whenever any input line is energized. Therefore, when $C_L$ pulses are applied to "AND" gates 12 and 20, there will be no output from either gate unless the other input of each gate is energized. In the case of "AND" gate 12, there will be no output until Flip Flop C, terminal 27, is in the "ONE" or high state, while in the case of gate 20, there will be no output until terminal 29 of Flip Flop A is in the "ONE state. Therefore, with Flip Flops A, B and C in state of 0, 1, 0 respectively, terminals 29 and 27 of Flip Flops A and C are in the "zero" or low state, so that $C_L$ pulses applied to "and" gates 12 and 20 cannot pass through to change the states of Flip Flops A and C. In the case of the single input "and" gate 16, $C_L$ pulses will always pass through the gate 16, and also through "OR" gate 25 to set the "ONE" side of Flip Flop B, but since Flip Flop B is initially in the "ONE" state, it will not change state. Also, an overflow pulse $X_0$ (64, FIG. 1) produced when a $C_L$ leading edge pulse is missing, while the Sync Detector is in sync mode and prior to a D pulse will leave the unit in the 0, 1, 0 state. From FIG. 2 it can be seen that "and" gate 17 will be the only "and" gate with an output, when an $X_0$ pulse appears on line $X_0$, since there will be no coincident inputs at "and" gates 13, 15, 19 and 23. Since Flip Flop B is already at state "ONE," the output of gate 17, applied thru "OR" gate 25, will not change the state of Flip Flop B. However, when $X_0$ occurs prior in time to a D pulse, pulse $Z_3$ is generated. Pulse $Z_3$ resets the PWC, and switches several indicating flip flops to signal the memory logic. Since the CAC is indexed by $X_0$ so that it advances to the current channel count, an all-zero data word is stored in memory for that channel.

When the CAC advances to the address of the frame-ending channel, the function D is generated which causes the Sync Detector to make a transition to state 0, 1, 1. As shown in FIG. 2, the D input is applied to "and" gate 21; when line 28 of FF B is at "ONE," gate 21 will have an output, which is applied through "OR" gate 26 to cause terminal 27 side of FF C to change state from "zero" to "ONE;" since this will be the only flip flop to change state, FF's A, B and C will therefore change from 0, 1, 0 to 0, 1, 1. D pulses will be generated at a one megacycle rate while the CAC is in the frame-ending address, but these additional D pulses do not cause further Sync Detector transitions since they cannot pass through "AND" gate 21. Essentially, state 0, 1, 1 is a memory state which stores the fact that the frame-ending channel has been detected.

If the frame-ending address in the CAC corresponds to the frame-ending channel, then two successive $X_0$ overflow pulses must occur before another $C_L$ pulse occurs. When the first overflow pulse occurs, the Sync Detector transitions to state 1, 0, 1 from the previous state 0, 1, 1. From FIG. 2, it can be seen that the first $X_0$ pulse passes through "AND" gates 13, 17, and 19; gate 13 is enabled from the "ONE" output of FF C, allowing the first $X_0$ pulse to pass through; this pulse then also passes through "OR" gate 24 to switch FF A to a "ONE." The first $X_0$ pulse passes through the single input "AND" gate 17, through "OR" gate 25, to FF B, but since FF B is already at a "ONE," the pulse applied to this side of FF B will have no effect on FF B. However, the $X_0$ pulse passes through "AND" gate 19, which is also enabled from the "ONE" output of FF C, to the low side of FF B, thus switching FF B from a "zero" to "ONE"; hence, after the first overflow pulse, the state of FF's A, B, and C are 1, 0, 1 respectively.

At the same time the transition to state 1, 0, 1 occurs, pulse $Z_2$ is generated; $Z_2$ sets a signal flip flop to demand storage of the current time-of-day word in the first vacant channel location. CAC is indexed to the current channel address by the first $X_0$ pulse. D pulses no longer occur after CAC is indexed.

When the second $X_0$ pulse occurs, the Sync Detector will transition back to state 0, 1, 0; the second $X_0$ pulse will pass through all "AND" gates, since all are enabled to switch all FF's back to the original 0, 1, 0 state.

Upon the transition to state 0, 1, 0 a sub-frame pulse $Z_5$ (69, FIG. 1) is generated; this turns on a signal flip flop to demand storage of vernier time. This sub-frame pulse also indexes the Frame Sync Counter 75.

If the sequence $D-X_0-X_0$ is interrupted by a $C_L$ pulse, then the Sync Detector cannot be in true synchronization because there must be two missing channels and hence two overflow pulses $X_0$, at the end of the frame. Thus the sequence $D-C_L$, or $D-X_0-C_L$ will cause the Sync Detector to enter state 1, 1, 1; upon change to this state, the Search Marker Flip Flop (SMFF) will be turned on; thus all data samples stored while the Snyc Detector is in the state 1, 1, 1 mode will be flagged.

While in the 1, 1, 1 state, the Sync Detector searches for two successive missing channels; D and $C_L$ pulses are ignored, since, although they pass through their respective "AND" gates, they cannot change the states of FF's A, B or C; however, D and $C_L$ pulses will continue to sequence the remainder of the PDM conversion logic.

When one $X_0$ pulse occurs, the Sync Detector transitions to state 1, 0, 0, to store the fact that one missing channel has been detected. If $C_L$ occurs after this, the Sync Detector returns to state 1, 1, 1 and continues to search for two successive overflows (missing channels). When this event occurs, the Sync Detector moves successively from state 1, 1, 1 to 1, 0, 0 to 0, 1, 0. Upon this last transition, pulse $Z_6$ is generated, which turns off SMFF and generates the Frame Pulse.

A manual set input of each flip flop allows the Sync Detector to enter the search mode in state 1, 1, 1. It will then search out the missing channels and lock into synchronization.

It should be noted that the Sync Detector will lock onto the first two successive missing channels it detects. Therefore if two successive channels are vacant in addition to those at the end of the frame, then it is equally likely that the Sync Detector will synchronize in the wrong location. It is possible to detect the fact that two successive channels (other than at the end of the frame) are missing since two successive channels will be stored as binary zero. However, there is no way to tell which two channels the Sync Detector locked onto without analysis of the data itself. This is the only case of loss of frame synchronization due to two successive channel dropouts, with the exception when consecutive number of dropouts becomes so great that the overflow pulse actually skips over a channel.

The frame Sync Counter 75 is a 2-bit binary counter which counts the number of input frames processed. The Sync Detector generates the $Z_1$ pulse for each input frame, as previously described, which produces the input to the counter. Control relays determine which count in the Frame Sync Counter generates the Frame Sync Pulse, corresponding to the size commutator being processed. A Frame Sync Pulse is also generated by the Sync Detector, when two successive overflow pulses are detected, and the Sync Detector moves from state 1, 1, 1 to 1, 0, 0 to 0, 1, 0. This Frame Sync Pulse is used to operate other elements in a data processing system.

Therefore, it can be seen that, depending on the state of the Sync Detector Flip Flops, the Detector will either search for or maintain frame synchronization.

What is claimed is:

1. An apparatus for the concurrent processing of pulse duration modulated signals from a plurality of sources, converting the signals into digital form, and merging said digital data into a standard output format, said apparatus comprising means for the digital measurement of signal pulse width, said width measuring means including means for utilizing the leading edge of each data pulse as the measurement initiating instrumentality to set said width measuring means to an initial condition, and also including means for utilizing the trailing edge of each data pulse as a measurement terminating instrumentality, means for storage of said digital measurement upon application of said trailing edge utilization means, means for the identification of the address of each signal channel and counting said address, means responsive to said identification means to prevent loss of input data and maintain synchronization with the input data, and means for merging said digital data, with said channel address and special code bits, into a standard output digital format.

2. An apparatus for the conversion of pulse duration modulated signals into digital form, said apparatus comprising digital counting means to measure the time duration of each signal, means for initiating said counting means responsive to the leading edge of the signal pulse to set counting means to an initial condition, and means for storage of said digital measurement responsive to the trailing edge of the signal pulse.

3. Apparatus as defined in claim 2, including means for maintaining synchronization between said signals, said means including address identifying circuitry, digital counting means forming part of said address identifying circuitry, and means responsive to operation of said address identifying circuitry to establish synchronization between said address identifying circuitry and the incoming data pulse train.

4. An apparatus for the concurrent processing of pulse duration modulated signals from a plurality of sources, converting the signals into digital form, and merging said digital data into a standard output format, said apparatus comprising means for deriving a leading edge pulse and a trailing edge pulse from each data pulse, a pulse width counter set to an initial zero condition by said leading edge pulse, storage means for the storage of the digital information transferred from said pulse width counter upon application of said trailing edge pulse, means for the identification of the address of each signal channel and counting said address responsive to said leading edge pulse, means responsive to said identification means to prevent loss of input data and maintain synchronization with the input data, and means for merging said digital data with said channel address into a standard output digital format.

References Cited by the Examiner

UNITED STATES PATENTS 2,941,196 6/1960 Raynsford ---------- 340—347

MAYNARD R. WILBUR, *Primary Examiner.*

ROBERT C. BAILEY, *Assistant Examiner.*